Figure 1:
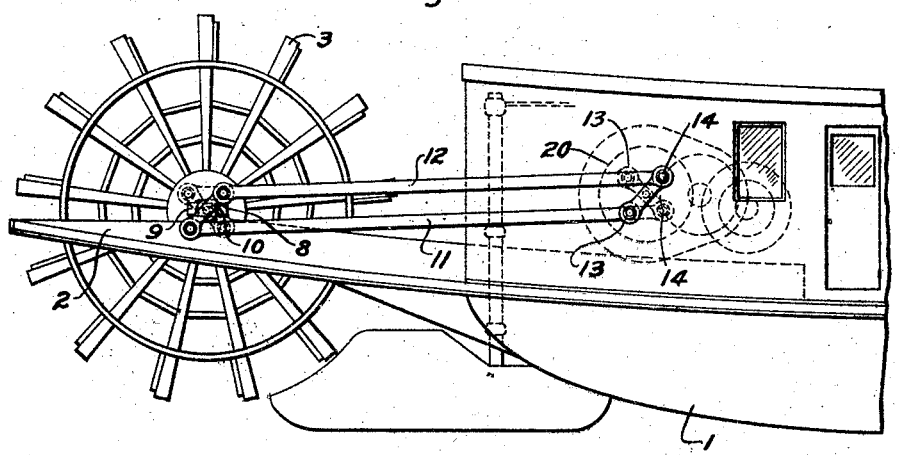

Aug. 31, 1926.

E. A. SLATER

SHIP PROPULSION

Filed Sept. 8, 1923

1,597,836

WITNESSES:

INVENTOR
Earl A. Slater
BY
ATTORNEY

Patented Aug. 31, 1926.

1,597,836

UNITED STATES PATENT OFFICE.

EARL A. SLATER, OF WILKINSBURG, PENNSYLVANIA, ASSIGNOR TO WESTINGHOUSE ELECTRIC & MANUFACTURING COMPANY, A CORPORATION OF PENNSYLVANIA.

SHIP PROPULSION.

Application filed September 8, 1923. Serial No. 661,541.

My invention relates to drive mechanisms, more especially to ship propulsion mechanisms of the connecting rod type.

It is among the objects of my invention to provide a drive mechanism for ship propulsion, for example, which shall be of simple and rugged mechanical construction, which shall consist of a minimum number of parts and which shall be designed to eliminate the stresses on the propeller member and the co-operating driving and connecting parts.

My invention is especially applicable to the stern paddle-wheel type of boat that is commonly employed in river service for tow boats and the like.

In this type of drive, the driving mechanism is connected by crank rods to the paddle-wheel, and the single rods as heretofore employed were subjected to severe working stresses under the normal propulsion and reversal of the boat or ship.

My present invention is directed to a propulsion mechanism utilizing a plurality of side rods on both sides of the paddle-wheel, the rods being connected to a crank shaft having double crank arms at its respective ends. The crank pins have an angular relation of 180° and either the paddle-wheel bearings or the drive shaft bearings are journalled in bearing blocks which are slidably mounted to permit of relative movement of the driving or driven members, thus relieving the stresses on the connecting rods and ship framing.

The use of the double connecting rods further reduces the stress on the connecting rods and ship framing that has developed in prior types of driving mechanism, the two rods on each side forming a balanced couple; one rod is in compression while the other is in tension, each taking half of the load that was concentrated in one rod in such prior drives. This balanced couple transmits torque only from the driving shaft to the driven shaft, thereby eliminating the reversal of stress on the bearings, which, in prior drives using only one rod on each side, was equal to the total stress on the rod.

Figure 2:
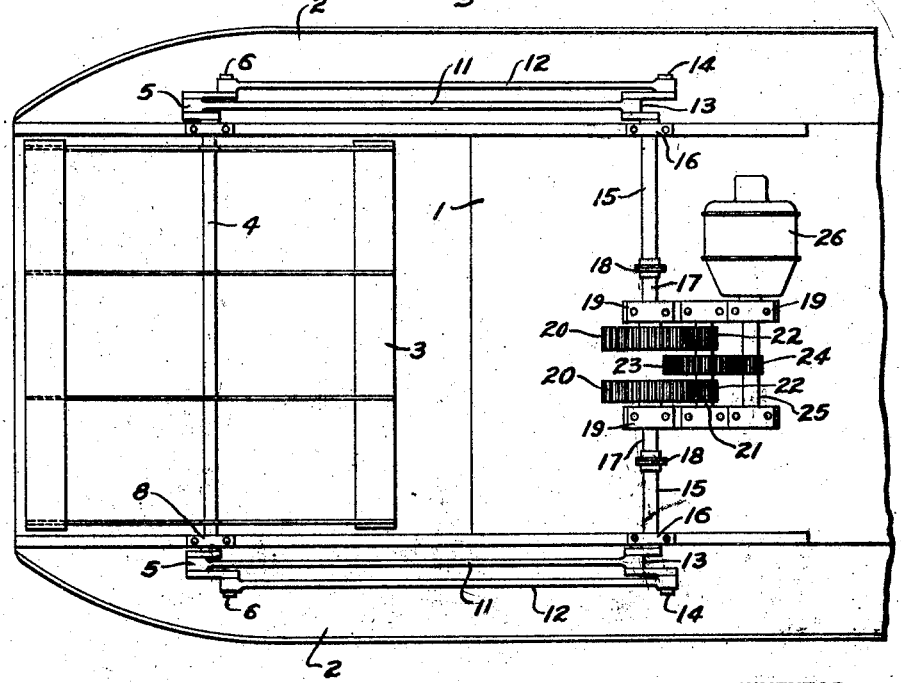

In the accompanying drawing constituting a part hereof and in which like reference characters designate like parts:

Fig. 1 is a side elevational and diagrammatic view of the stern of a boat employing a drive that embodies the principles of my invention, and Fig. 2 is a corresponding plan view thereof.

Referring to the drawing, a boat 1 is provided with the usual rear extension members 2 that are adapted to rotatably support the paddle-wheel 3, which is provided with an axle 4 having double crank pins 5 and 6 on the respective ends thereof. The axle 4 is journalled in bearing blocks 8 that are movably mounted in longitudinal slide brackets 9 each having an elongated opening 10 that permits of longitudinal movement of the block 8. The crank pins 5 and 6 are connected by side rods 11 and 12 to cranks 13 and 14, respectively, of a plurality of crank shafts 15, which are journalled for rotation in suitable bearing brackets 16.

The crank shafts 15 are joined to a plurality of stud shafts 17 by couplings 18, for example, the shafts 17 being journalled in pillar block bearings 19 and being provided with gear-wheels 20, or the like, on their respective ends, to effect a driving connection with an idler shaft 21 having pinions 22 and an intermedite gear-wheel 23 mounted thereon. The gear-wheels 20 mesh with the respective pinions 22, while the gear-wheel 23 is in engagement with a pinion 24, which is mounted on the shaft 25 of an electrical or other drive motor 26.

In operation, the crank shafts 15 are actuated by the motor 26 through the reduction gearing comprising gear-wheels 20, 22, 23 and 24. The torque transmitted through the connecting rods 11 and 12 is distributed practically uniformly upon the four connecting rod members, so that they are alternately in tension and compression. The torque transmitted through the axle 4 to rotate the paddle-wheel 3 minimizes the stresses on the bearing members because of the sliding movement of the bearing blocks 8 in the openings 10 of the brackets 9. If desired, the axle 4 may be journalled in a fixed bracket and the crank shafts 15 may be movably mounted in sliding block bearings to function similarly to the movable bearings of the paddle-wheel axle herein illustrated. This movement of the bearing members provides self-adjustment of the bearings to compensate for wear and reduces stressing of the rods 11 and 12 considerably. The cranks of the wheel axle 4 and of the crank shafts 15 are displaced 90° on the star-board side from the cranks on the port side.

It is evident from the above description of my invention that a ship propulsion or other drive mechanism embodying the principles herein set forth provides an efficient drive that materially reduces the expense of operation by reducing the wear and breakage of the several operating parts, and also that such a mechanism may be designed to adapt it to very severe operating conditions.

Although I have described a specific embodiment of my invention, it will be obvious to those skilled in the art that various modifications may be made in the details of construction without departing from the principles herein set forth.

I claim as my invention:—

1. A drive mechanism comprising a drive shaft, a plurality of crank shafts severally having double cranks connected to said drive shaft and crank pins substantially 180° apart, and rods connecting said cranks, one of said crank shafts being movable relative to the other.

2. A ship propulsion mechanism comprising a propeller member, a plurality of crank shafts associated therewith, double rods connecting the cranks of said crank shafts, and a slide-block bearing, one of said latter shafts being journalled in said slide-block bearing.

3. A ship propulsion mechanism comprising a paddle-wheel having a crank shaft, a plurality of rods for connecting said crank-shaft to a drive shaft, said wheel crank shaft being movable longitudinally relative to said drive shaft.

4. A ship propulsion mechanism comprising a paddle-wheel having a crank shaft, slide-block bearings for said crank shaft movably mounted on the stern of the ship, a drive shaft rotatably journalled in working alinement with said wheel and having cranks on the respective ends thereof and a pair of drive rods pivotally mounted on both ends of said shafts.

5. A ship propulsion mechanism comprising a plurality of slide-block bearings disposed near a paddle wheel rotatably mounted in said bearings, a plurality of drive rods disposed on both sides of said wheel, crank arms on said wheel having pivotal connections therewith, and a drive mechanism having a drive shaft provided with cranks, said rods being connected to the cranks of said drive shaft.

6. A ship propulsion mechanism comprising a paddle-wheel journalled for rotation at the stern of a ship, a crank shaft, a pair of drive rods connected on each side of said wheel and to the cranks of said shaft, and a motor for driving said shaft, said paddle-wheel being adapted to move longitudinally with respect to the drive shaft.

7. A ship propulsion mechanism comprising a paddle wheel journalled for rotation at the stern of a ship, a crank shaft, a pair of drive rods connected on each side of said wheel and to the cranks of said shaft, and a motor for driving said shaft, said paddle-wheel being adapted to move longitudinally with respect to the drive shaft, a plurality of crank arms being connected to said paddle-wheel and having an angular relation of 180°.

In testimony whereof I have hereunto subscribed my name this 18th day of August, 1923.

EARL A. SLATER.